Figure 3:
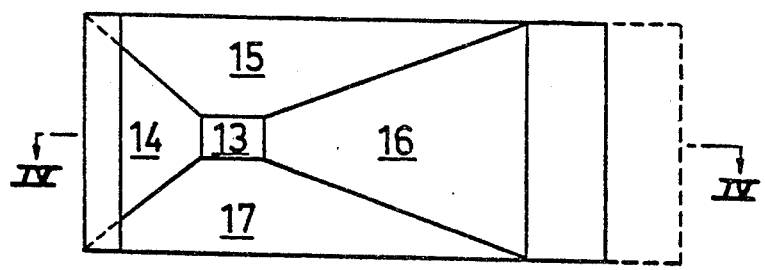

United States Patent [19]
Johansson et al.

[11] 4,260,433
[45] Apr. 7, 1981

[54] METHOD OF FORMING AND COLLECTING SLAG PRODUCTS FORMED AT A MELTING PROCESS, ESPECIALLY AT GAS PLANING

[75] Inventors: Bengt A. Johansson, Skärhamn; Ake K. Nyvall, Kungälv; Frank G. Jonsson, Hisingsbacka, all of Sweden

[73] Assignee: Centro-Maskin Göteborg AB, Göteborg, Sweden

[21] Appl. No.: 963,121

[22] Filed: Nov. 22, 1978

[30] Foreign Application Priority Data
Nov. 24, 1977 [SE] Sweden ................................ 7713300

[51] Int. Cl.³ .................................................. B23K 7/00
[52] U.S. Cl. .......................................... 148/9.5; 266/49
[58] Field of Search .................. 266/49; 148/9, 9.5

[56] References Cited
U.S. PATENT DOCUMENTS

| | | | |
|---|---|---|---|
| 2,030,050 | 2/1936 | Coberly | 266/49 |
| 2,380,188 | 7/1945 | O'Connor | 266/49 |
| 2,465,297 | 3/1949 | Thompson et al. | 266/49 |
| 2,756,842 | 7/1956 | Chamberlin et al. | 266/49 |
| 3,436,276 | 4/1969 | Thompson | 148/9.5 |
| 4,115,152 | 9/1978 | Johannson | 266/49 |
| 4,115,153 | 9/1978 | Johannson | 266/49 |
| 4,120,703 | 10/1978 | Engel | 266/49 |

*Primary Examiner*—M. J. Andrews
*Attorney, Agent, or Firm*—Burns, Doane, Swecker & Mathis

[57] ABSTRACT

A method of forming and collecting slag products in connection with gas planing, at which method the melt is moved in an ambient atmosphere through such a distance, that the substances in the melt are oxidized and/or cooled so much prior to their collecting, that there is no risk that the products at their collecting are sintered together.

3 Claims, 4 Drawing Figures

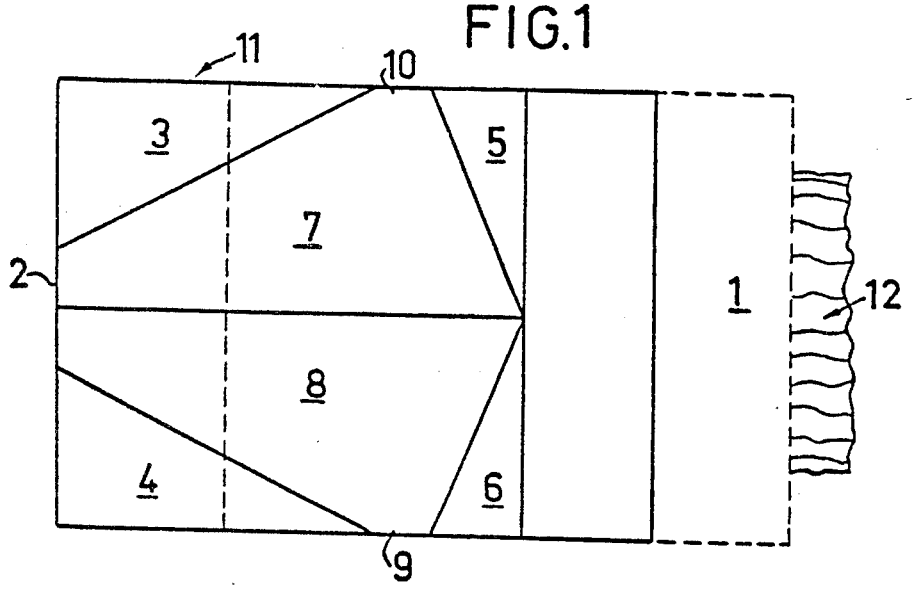
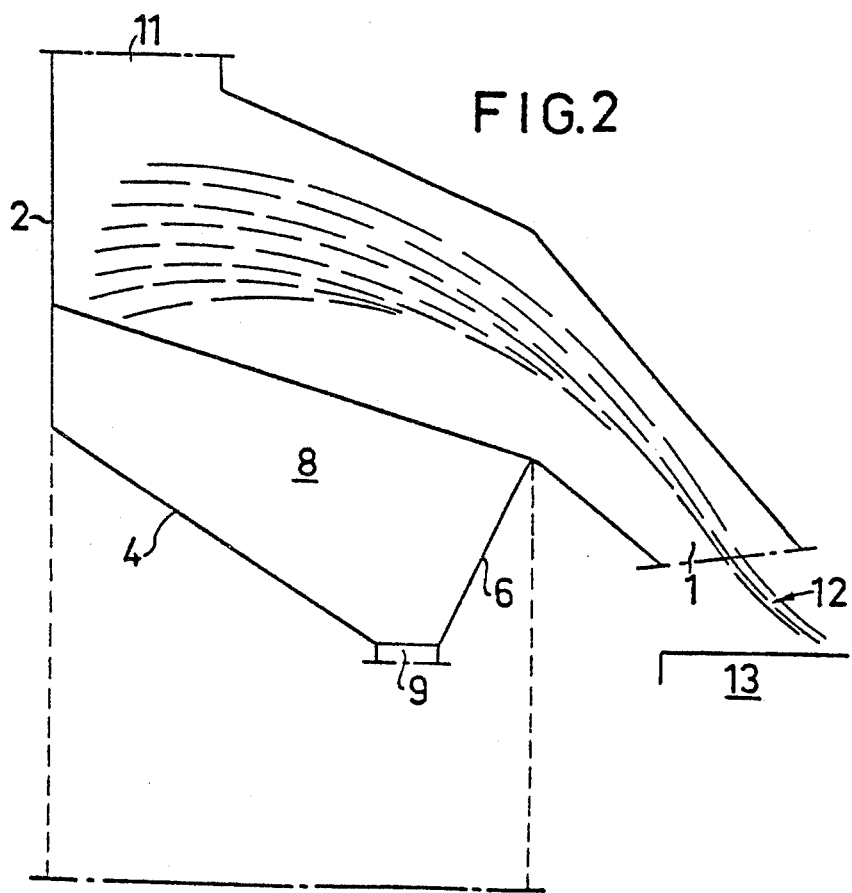

METHOD OF FORMING AND COLLECTING SLAG PRODUCTS FORMED AT A MELTING PROCESS, ESPECIALLY AT GAS PLANING

This invention relates to a method and an apparatus for forming and collecting slag products, especially during gas planing.

Gas planing machines mostly are provided with slag handling means, in which a water nozzle of some kind is located directly behind a burner nozzle. The water nozzle is directed substantially perpendicularly to the main direction of the gas flow and by a forceful water jet cuts off the melt, which is formed during the process, transporting the melt into a collecting means. The water-slag mixture, to which mostly more water is added, is transported to a coarse separator and further to a sedimentation plant.

Gas planing has as its main object the cutting of the surface of a defective workpiece. The material in the layer is heated to melting temperature and initially removed in the planing direction, whereafter it is collected in a slag handling means, which operates as mentioned, for example, with water admixture.

By the present invention, the melt formed during the planing operation is converted to slag products which, when compared with what is usually the case, are easier to handle and more valuable, while not requiring admixture of water.

This is achieved by the present invention, in the method and the apparatus have been given the characterizing features defined in the attached claims.

The method of the present invention advantageously is worked together with a planing device as disclosed in Swedish Pat. application No. 7608208-0, which device comprises gas and air flows for lifting the forward end of the melt and transporting the melt upward-forward.

By use of the present invention dry slag products are obtained, which products can easily be transported to a collecting vessel or the like.

The use of the method and apparatus of the present invention also ensures that a large part of the molten material, having been removed, oxidizes during the transport into the combined exhaust and collecting means. The final slag product thereby assumes the configuration of small round balls, so-called pellets, which is especially advantageous from a handling aspect. The pellets are then collected on the bottom of the collecting means due to the effect of gravity. Said bottom preferably is surrounded by inclined side portions, which direct the slag material to one or more openings located in connection to the bottom.

Figure 4:
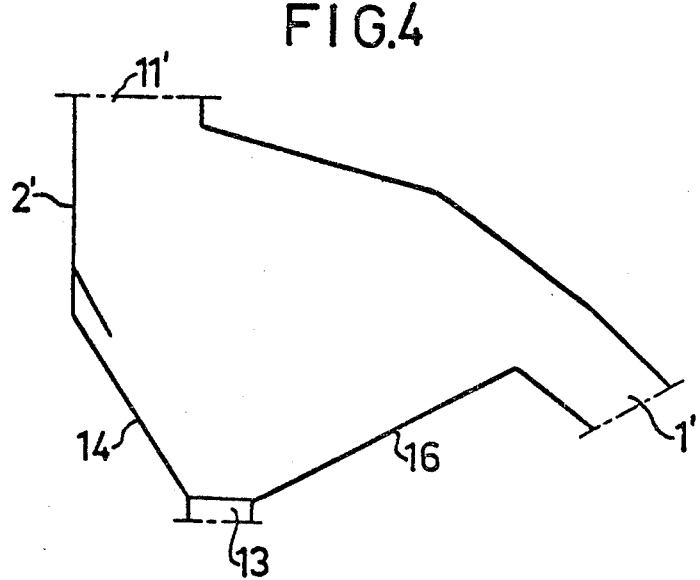

The invention is described in the following, with reference to embodiments shown in the drawings, in which FIG. 1 is a view from above of the bottom portion of a combined suction and collecting means, FIG. 2 is a lateral view of the means depicted in FIG. 1, from which means the sidewall is removed, FIG. 3 shows another embodiment of the bottom portion of a combined suction and collecting means, and FIG. 4 is a section of the combined suction and collecting means along the line IV—IV in FIG. 3.

FIGS. 1 and 2 depict a first embodiment of a combined suction and collecting means. The melt 12 (FIG. 2) is thrown through the inlet 1 of the means against the wall 2. During its travel through the air the melt is oxidized and cooled, thereby preventing the slag product from sintering on the wall. Due to the oxygen-enriched atmosphere prevailing in and about the melt which may be attributed to the planing operation's use of an ample excess supply of oxygen, i.e. only part of the oxygen is consumed for the planing operation proper, the melt can be oxidized substantially completely before it contacts the wall and bottom portions of the combined suction and collecting means.

The distance between the inlet 1 and the wall 2 is chosen so that the main part of the melt manages to oxidize and/or at least cool to such an extent during the travel through the air to the wall that the risk of the slag particles sintering together and the risk of sintering on the walls of the combined suction and collecting means are substantially eliminated. The distance between the inlet and the wall 2 can be chosen so as to take into account the composition of the material to be planed by oxygen. After having entered the combined suction and collecting means, the slag material drops under the influence of gravity to the lower portion of the means where it is collected, or is discharged through openings 9 and 10 at the bottom of the means. The outer bottom and the side portions 3, 4, 5, and 6 consist of inclined planes, as do the central bottom portions 7, 8, which are so inclined that the slag material continues with its downward movement to the openings 9 and 10. Said openings 9 and 10 may open above a slag-conveying device; for example, a collecting carriage, a belt conveyor, pipeline or the like.

In FIGS. 3 and 4 another embodiment of a combined suction and collecting means is shown, which embodiment advantageously can be used in gas planing where the nozzle width is limited, or when the edge portion of a workpiece is to be planed.

In edge planing, of course, the inlet of the suction and collecting means must be adjusted to the geometry of the melt jet obtained. In this embodiment only one opening 13 is necessary, since the wall and bottom portions 14, 15, 16, and 17 of the means can be inclined so as to gravitationally guide and promote the movement of the slag material to the opening 13.

In the remaining aspects the suction and collecting means according to this latter embodiment is consistent with the embodiment of FIGS. 1 and 2. The distance between the inlet and the side and bottom portions, therefore, is so chosen that the melt is allowed to completely oxidize during its travel through the air into the combined suction and collecting means.

The fumes and the small particles which are formed during the planing operation are sucked from the upper rear portion 11 of the combined suction and collecting means and transported further to a zone of low speed. The suction air contributes to the cooling of the melt particles during their passage through the combined suction and collecting means.

Said low-speed zone is the first part in a conventional separation plant, which further may comprise cyclones and an electrostatic precipitation, a compact cell filter or the like. The fumes produced in this method are so dry that an electrostatic precipitator will be very effective.

Depending on the cutting capacity of the planing tool, the composition of the material, and the transport speed of the melt into the suction and collecting means, it is possible in certain connections, or even necessary, to so dimension the distance between the inlet, side and bottom portions of the collecting means, so that the bottom portion of the means is located on a level substantially below the level for the workpiece surface to be cut so that said distance will be sufficiently large to permit the oxidizing/cooling of the melt/slag material.

What we claim is:

1. In a gas planing process wherein the melt formed during the planing operation is converted to slag products and collected during the process, the improvement comprising:

transporting the melt formed during the gas planing process by means of a forced air stream containing an amount of oxygen in excess of that which is required for the gas planing process;

causing said melt to travel over a sufficient distance prior to being collected such that the melt is oxidized; and thereafter collecting the oxidized melt as discrete particles of slag product.

2. The method of claim 1 wherein said melt is gravitationally transported into said collection means.

3. The method of claim 1 wherein said collection means has inclined side and bottom portions which guide the transport of said discrete particles toward a bottom portion of said collection means.

* * * * *